US012597264B2

(12) United States Patent
Borer, IV et al.

(10) Patent No.: US 12,597,264 B2
(45) Date of Patent: Apr. 7, 2026

(54) METHOD FOR CALIBRATING AN ASSISTANCE SYSTEM OF A CIVIL MOTOR VEHICLE

(71) Applicant: Spleenlab GmbH, Saalburg-Ebersdorf (DE)

(72) Inventors: John J. Borer, IV, Saalburg-Ebersdorf (DE); Florian Ölsner, Saalburg-Ebersdorf (DE); Jeremy Tschirner, Saalburg-Ebersdorf (DE); Stefan Milz, Saalburg-Ebersdorf (DE)

(73) Assignee: Spleenlab GmbH, Saalburg-Ebersdorf (DE)

( * ) Notice: Subject to any disclaimer, the term of this patent is extended or adjusted under 35 U.S.C. 154(b) by 0 days.

(21) Appl. No.: 18/677,268

(22) Filed: May 29, 2024

(65) Prior Publication Data

US 2024/0404293 A1 Dec. 5, 2024

(30) Foreign Application Priority Data

Jun. 5, 2023 (DE) ..................... 10 2023 114 676.9

(51) Int. Cl.
G06V 20/56 (2022.01)
B60W 50/14 (2020.01)
(Continued)

(52) U.S. Cl.
CPC ............. G06V 20/56 (2022.01); B60W 50/14 (2013.01); G06T 7/50 (2017.01); G06T 7/80 (2017.01);
(Continued)

(58) Field of Classification Search
None
See application file for complete search history.

(56) References Cited

FOREIGN PATENT DOCUMENTS

DE 102021121184 A1 2/2023

OTHER PUBLICATIONS

J. Zhu, J. Xue and P. Zhang, ("CalibDepth: Unifying Depth Map Representation for Iterative LiDAR—Camera Online Calibration," May 29, 2023 IEEE International Conference on Robotics and Automation (ICR), hereinafter Zhu ) (Year: 2023).*

(Continued)

*Primary Examiner* — Samuel D Fereja
(74) *Attorney, Agent, or Firm* — Boyle Fredrickson, S.C.

(57) ABSTRACT

A method for calibrating an assistance system of a civilian motor vehicle. The method comprises capturing image data for surroundings of a civilian motor vehicle by means of a camera device in an image sensor coordinate system; capturing depth data indicating first distances between the civilian motor vehicle and objects in the surroundings by means of a depth sensor device; deriving second distances between the civilian motor vehicle and objects represented in the image data by means of image analysis based on artificial intelligence in a data processing device, and creating three-dimensional image data from the image data and the second distances in a three-dimensional image sensor coordinate system; calibrating the image data and the depth data with respect to each other in the data processing device, comprising determining a transformation rule; and applying the transformation rule to subsequently acquired image data. Further, a civilian motor vehicle is provided.

14 Claims, 6 Drawing Sheets

(51) Int. Cl.
    G06T 7/50        (2017.01)
    G06T 7/80        (2017.01)
    G06T 15/00      (2011.01)

(52) U.S. Cl.
    CPC ....  G06T 15/00 (2013.01); *G06T 2207/20084*
              (2013.01); *G06T 2207/30252* (2013.01)

(56)             References Cited

OTHER PUBLICATIONS

Vaida et al., Automatic extrinsic calibration of LIDAR and mon-
ocular camera images, 2019 IEEE 15th International Conference on
Intelligent Computer Communication and Processing (ICCP), 2019,
117-124.
Zhu Jiangtong et al., CalibDepth: Unifying Depth Map Represen-
tation for Iterative LIDAR-Camera Online Calibration, 2023 IEEE
International Conference on Robotics and Automation (ICRA 2023),
May 29-Jun. 2, 2023, 726-733, London, UK.
Gaurav Pandey et al., Automatic Extrinsic Calibrating of Vision and
Lidar by Maximizing Mutual Information, Journal of Field Robot-
ics, Sep. 15, 2014, 1-27, Bd. 32, Nr. 5, Wiley Periodicals, Inc.
Xu Hanbo et al., Online Intelligent Calibration of Cameras and
LiDARs for Autonomous Driving Systems*, 2019 IEEE Intelligent
Transportation Systems Conference (ITSC), Oct. 27-30, 2019, 3913-
3920, Auckland, NZ.

\* cited by examiner

300A

300B

300C

METHOD FOR CALIBRATING AN ASSISTANCE SYSTEM OF A CIVIL MOTOR VEHICLE

FIELD OF THE INVENTION

The invention relates to a method for calibrating an assistance system of a civilian motor vehicle.

BACKGROUND

In order to increase the safety in road traffic, civilian motor vehicles increasingly have devices for measuring and analyzing depth data. The depth data are used in particular to detect objects in the surroundings of a motor vehicle and can be integrated into driver assistance systems, for instance in the context of parking assistance, supporting autonomous driving and avoiding accidents. The depth data are measured by means of depth sensors. Examples of conventional depth sensors are lidar (light detection and ranging) and radar.

In addition to depth data, the use of image data in civilian motor vehicles is also known. Image data are acquired in the form of individual still images or also in the form of continuous image sequences (video). One or more cameras can be used on a motor vehicle to record the images. The image data can be used to supplement or improve the field of vision of the driver. In particular, it is known to combine depth data with image data and to display them to the driver. By way of example, closer objects can be highlighted in a displayed representation in order to alert the driver to hazardous situations.

In order to combine image data and depth data, they have to be calibrated. A known calibration method comprises providing an object having known dimensions at a known distance from a motor vehicle. The object is recorded by the depth sensors and cameras of the motor vehicle. Subsequently, software for analyzing the image data and the depth data is set in such a way that features of the recorded object, for instance edges and corners, can be associated with each other in the image data and the depth data.

SUMMARY

The object of the invention is to provide a method for calibrating an assistance system of a civilian motor vehicle.

To achieve this, a method for calibrating an assistance system of a civilian motor vehicle according to independent claim 1 is provided. Further, a civilian motor vehicle according to independent claim 14 is provided. Embodiments are the subject matter of dependent claims.

According to one aspect, a method for calibrating an assistance system of a civilian motor vehicle is provided, comprising: capturing image data for the surroundings of a civilian motor vehicle by means of a camera device arranged on the civilian motor vehicle in an image sensor coordinate system; capturing depth data for the surroundings of a civilian motor vehicle by means of a depth sensor device arranged on the civilian motor vehicle, wherein the depth data indicates first distances between the civilian motor vehicle and objects in the surroundings of the civilian motor vehicle in a depth sensor coordinate system; deriving second distances between the civilian motor vehicle and objects in the surroundings of the civilian motor vehicle represented in the image data from the image data by means of an image analysis based on artificial intelligence in a data processing device, and creating three-dimensional image data from the image data and the second distances in a three-dimensional image sensor coordinate system; calibrating the image data and the depth data with respect to each other in the data processing device, comprising determining a transformation rule by means of which the three-dimensional image data are transformed into the depth sensor coordinate system so that the coordinates of the first and the second distances coincide in the depth sensor coordinate system; the depth data are transformed into the three-dimensional image sensor coordinate system so that the coordinates of the first and the second distances coincide in the three-dimensional image sensor coordinate system; or the three-dimensional image data and the depth data are transformed into a predetermined coordinate system so that the coordinates of the first and the second distances coincide in the predetermined coordinate system; and applying the transformation rule to subsequently acquired image data and/or depth data by means of the data processing device.

The image data are typically present in a raster format. The image sensor coordinate system is two-dimensional. Its origin can lie, for example, in one of the corners of the raster (or grid), in the center of the raster or at a predefined arbitrary point in the raster. The horizontal axis of the image sensor coordinate system can correspond to the horizontal orientation of the camera device, and the vertical axis can correspond to the vertical orientation.

The depth data are three-dimensional and are present as a point cloud and/or as a collection of vector data. In particular, the depth data can be present in the form of lines, wherein all points on a line have the same distance from the observer or from the depth sensor. The origin of the depth sensor coordinate system can correspond to the location of the depth sensor. The horizontal and the vertical axis can correspond to the horizontal and vertical orientation of the depth sensor, and the third axis can correspond to its optical axis.

When deriving distances between the civilian motor vehicle and objects represented in the image data, three-dimensional data are generated from two-dimensional data. The artificial intelligence preferably used for this purpose is, for example, a neural network which has been trained by means of training data in order to determine a specific distance from the origin of the image sensor coordinate system for each pixel in a two-dimensional raster. This can comprise determining distances (spacing) of objects on the basis of stereo recordings (when using two or more camera devices) or on the basis of changes in successive images of an image sequence, or taking other measures for determining the distance or combining them with the aforementioned measures. The derived distances can be present in the same units—for example meters per pixel—as the two-dimensional data. Alternatively, they can be present in other units or else, compared with the two-dimensional data, in an enlarged or reduced representation; in both cases, however, the distance values are congruent with one another and correctly reproduce the spacing relationships. A conversion factor can be established or determined, with which the distance values can be brought into congruence with the two-dimensional data.

The actual calibrating of the image data and the depth data with respect to each other is used for the purpose of assigning points, vectors, lines and/or objects of both data to one another and thus creating a rule which can be applied to subsequently recorded data—image data or depth data—in order to map these onto one another, for example in order to superimpose them and display them to the driver. In this respect, in the sense of the present disclosure, a matching of the coordinates of distances is to be understood as meaning that coordinate points, at which the respective distances end, which correspond to one another and are thereby assigned to one another, coincide.

In one embodiment, the calibrating initially comprises determining matching characteristic object sections from the determined distances of the image data and the depth data. An object section comprises, for example, three-dimensional coordinates of corners or edges of objects or else individual salient points or complete objects. A characteristic object section is that part of an object which is particularly representative of the object in the image data and/or depth data and can be sufficient to at least partially define the shape of the object. Examples of characteristic object sections comprise the corners of a cube, cuboid or other geometric body which is delimited by planar surfaces; in these examples, the corners are more characteristic than the edges and than individual points or parts of the body surfaces. For spheres or general rotational bodies or arbitrary organic shapes, characteristic object sections can be given by their outlines or by parts thereof. Matching characteristic object sections are characteristic object sections of both data sets which can be mapped onto one another within a predefined tolerance value and which therefore represent the same object or the same part of an object with a high probability.

The transformation rule can be determined by one of at least three embodiments. In a first embodiment, the three-dimensional image data are transformed in such a way that the second distances from the three-dimensional image data coincide with the distances from the depth data. Therefore, the transformation rule is first determined in three-dimensional space on the basis of the distances of both data, then projected into the two-dimensional space and subsequently applied to further image data. The transformations applied here can comprise translation, rotation, shearing, scaling, etc. When the transformation rule is applied, the image data are transformed into the depth sensor coordinate system after the latter has been projected onto two dimensions. In embodiments which comprise the determination of characteristic object sections explained above, the transformation rule is determined on the basis of the characteristic object sections instead of the distances of the image data, wherein the characteristic object sections are brought into conformity with corresponding coordinates of the depth sensor data.

In a second embodiment, the three-dimensional depth data are transformed in such a way that the distances of the three-dimensional image data coincide with the distances of the depth data. The depth data are mapped here onto the three-dimensional image data coordinate system. In embodiments with characteristic object sections, instead of the distances, the determined object sections are brought into conformity with corresponding coordinates of the depth data.

In a third embodiment, the three-dimensional image data and the depth data are transformed into a predetermined coordinate system, wherein the coordinates of the distances of the image sensor and the depth sensor coordinate system, alternatively in one embodiment the characteristic object sections of both coordinate systems, coincide in the predetermined coordinate system. In one embodiment, the predetermined coordinate system is likewise three-dimensional; in one embodiment, the predetermined coordinate system is two-dimensional, and the transformation rule maps from the two three-dimensional coordinate systems onto the two-dimensional space, for instance by projection. The predetermined coordinate system can be predefined by a user, for example by selecting an image section in (the) displayed image data. Alternatively, the predetermined coordinate system can be created automatically as an averaging of the three-dimensional image sensor coordinate system and the depth sensor coordinate system, for instance by determining the center of an overlap of both systems as the origin of the predetermined coordinate system.

In one embodiment, determining the transformation rule in three-dimensional space can comprise projecting points from the depth data into the two-dimensional image sensor coordinate system and assigning them to a point or object of the image data in order to determine correspondences of the data of both data sets. The assignment can be carried out on the basis of specific similarities of the points/objects of both data sets, for example similar brightness values, similar brightness values in the neighborhoods, similar color values, similar color values in the neighborhoods. The assignment can be carried out iteratively for each point of the depth data. The iterations can also be carried out independently of one another and thus in parallel in order to accelerate the assignment.

The transformation rule determined in this way is preferably a matrix (transformation matrix). The matrix can in turn be the product of a plurality of matrices which each define a transformation, for example rotation, scaling, shearing. The matrix can carry out two-dimensional or three-dimensional transformations depending on the application. In the three-dimensional case, the matrix can be extended by parameters/coefficients for the third dimension; relevant formats for transformation matrices for transformation into three dimensions are known to the person skilled in the art.

If the transformation matrix is known, it can be applied to subsequently acquired image data and/or depth data in order to carry out further analyses of both data or to display the data in combined form. In one example, the data can be displayed superimposed in order to give the observer an impression of the distance of specific objects. Alternatively, objects in the image data can be highlighted or attenuated on the basis of their smaller or larger distance in order to draw the attention of the observer to the closer objects and not to distract the observer from the objects further away. For this purpose, different intensities or colors can be used: for example, a stronger intensity and/or color can be used for closer objects than for objects further away, or vice versa.

The calibrating of the image data and the depth data with respect to each other can be carried out continuously in real time. Alternatively, the calibrating can be carried out at regular intervals or at predefined times. In one embodiment, the calibrating can be carried out if the lighting conditions change substantially. For example, the method can comprise continuously measuring a brightness of the surroundings and can repeat the calibrating if the brightness falls below a predefined threshold value or rises above the (or another) threshold value. In one embodiment, a plurality of transformation rules can be determined at different lighting conditions; depending on the brightness, the respective transformation rule is applied to the image data and/or depth data.

The method can comprise fusing the image data transformed by means of applying the transformation rule and/or the depth data transformed by means of applying the transformation rule with each other or with the remaining image data or depth data to which the transformation rule does not apply, wherein image pixels and distances with coinciding coordinates are assigned to each other. Fusing the data can comprise superimposing, for instance by way of addition or subtraction of intensity or color values. Alternatively, individual objects in the image data can be highlighted or attenuated on the basis of their distance in accordance with the depth data, as has already been explained.

In particular, the fused data are used in a driver assistance system of the civilian motor vehicle. This can comprise displaying the data or also determining objects which lie within a predetermined minimum distance. In one embodiment, a warning can be displayed if an object is detected in too close proximity to the motor vehicle. This warning can comprise a displaying and an indication of the relevant object.

In certain embodiments, characteristic object sections are determined. Determining matching characteristic object sections in image data and depth data can comprise optimizing the image data by means of an image optimization algorithm. The optimization can comprise the application of specific filter operations, for example the application of edge detectors, contrast filters, filters for suppressing image noise. Data filtered in this way can further be examined for cohesive pixels, for example by means of segmentation and/or analysis for local or global maxima/minima. Analogously, image data and/or depth data can also be subjected to the mentioned filter operations without the use of characteristic object sections.

Creating three-dimensional image data from two-dimensional image data and determined distances between the civilian motor vehicle and objects in the surroundings of the civilian motor vehicle represented in the image data from the image data can comprise adding the respective distance from the civilian motor vehicle as third dimension to the already present two-dimensional image data as third information. A three-dimensional point cloud results, wherein each of the points is associated with the intensity and/or color of the corresponding image point.

Applying the transformation rule to subsequently acquired image data can comprise applying a two-dimensional projection of the transformation rule. Further, applying the transformation rule to depth data can comprise subjecting the depth data to a two-dimensional projection before or after applying the transformation rule.

The method can be carried out during a driving movement of the civilian motor vehicle. In particular, the method can be carried out without the use of a calibration standard. With such a calibration standard, one would calibrate on the basis of an object having previously known dimensions and a previously known distance from the civilian motor vehicle. The necessity of providing such an object is dispensed with by the invention since the invention includes determining distances determined or measured in the image data and the depth data, in some embodiments alternatively characteristic object sections, and automatically mapping these onto one another, as has been explained above. Thus, arbitrary surroundings and arbitrary objects having arbitrary dimensions and distances can be used. In addition, the calibration method can be repeated at any time without having to set up or visit a predetermined surroundings.

The depth data can be captured by means of at least one depth sensor device arranged on the civilian motor vehicle from the following group: lidar measuring device, time-of-flight measuring device and radar measuring device. In particular, the image data can be captured by means of at least one camera device arranged on the civilian motor vehicle from the following group: video image camera device, thermal image camera device and infrared camera device.

When deriving distances between the civilian motor vehicle and objects in the surroundings of the civilian motor vehicle represented in the image data from the image data, the image analysis can be based on artificial intelligence in the form of a neural network, in particular a monodepth network.

Further image data for the surroundings of the civilian motor vehicle can be captured by means of a further camera device arranged on the civilian motor vehicle in a further image sensor coordinate system. When using image data of a plurality of camera devices, the calibration steps can be carried out as follows. Firstly, image data of the further camera device are captured as second image data. On these image data, the steps for deriving distances between the civilian motor vehicle and objects represented in the second image data are carried out analogously to the derivation described above. In a first embodiment, the second image data are subsequently calibrated with the image data of the first camera device by determining matching distances, in one embodiment alternatively or additionally characteristic object sections, and determining a transformation rule; instead of the previously described steps carried out on the basis of the first image data and the depth data, the calibration now uses the first and the second image data analogously. In a second embodiment, the second image data are instead calibrated with the depth data; instead of the previously described steps, the calibration now uses the second image data and the depth data analogously. In a third embodiment, the second image data are successively calibrated with the first image data and the depth data. In each of these embodiments, at least one transformation rule is therefore determined which can be applied to subsequently acquired (first and second) image data and/or depth data. With such transformation rules, therefore, it is possible not only to calibrate image data with depth data, but also image data from more than one source, and this in turn with depth data.

Further depth data for the surroundings of a civilian motor vehicle can be captured by means of a further depth sensor device arranged on the civilian motor vehicle, wherein the further depth data indicates distances between the civilian motor vehicle and objects in the surroundings of the civilian motor vehicle in a further depth sensor coordinate system. Analogously to the example described above with a plurality of (first and second) image data, the calibration can therefore be carried out on the basis of the image data and depth data and the further depth data. Here too, a plurality of transformation rules can be determined, for instance between depth data and further depth data, between image data and further depth data and a combination of all three data.

A further aspect of the invention disclosed here additionally relates to a civilian motor vehicle having a camera device; a depth sensor device; and a data processing device, wherein the civilian motor vehicle is configured to carry out one or more of the methods described here.

The embodiments described above in connection with the method for calibrating an assistance system of a civilian motor vehicle can be provided correspondingly for the civilian motor vehicle and vice versa.

BRIEF DESCRIPTION OF THE DRAWINGS

Further exemplary embodiments are explained in more detail below with reference to figures of a drawing. In the drawings.

DETAILED DESCRIPTION OF THE PREFERRED EMBODIMENTS

Figure 1:
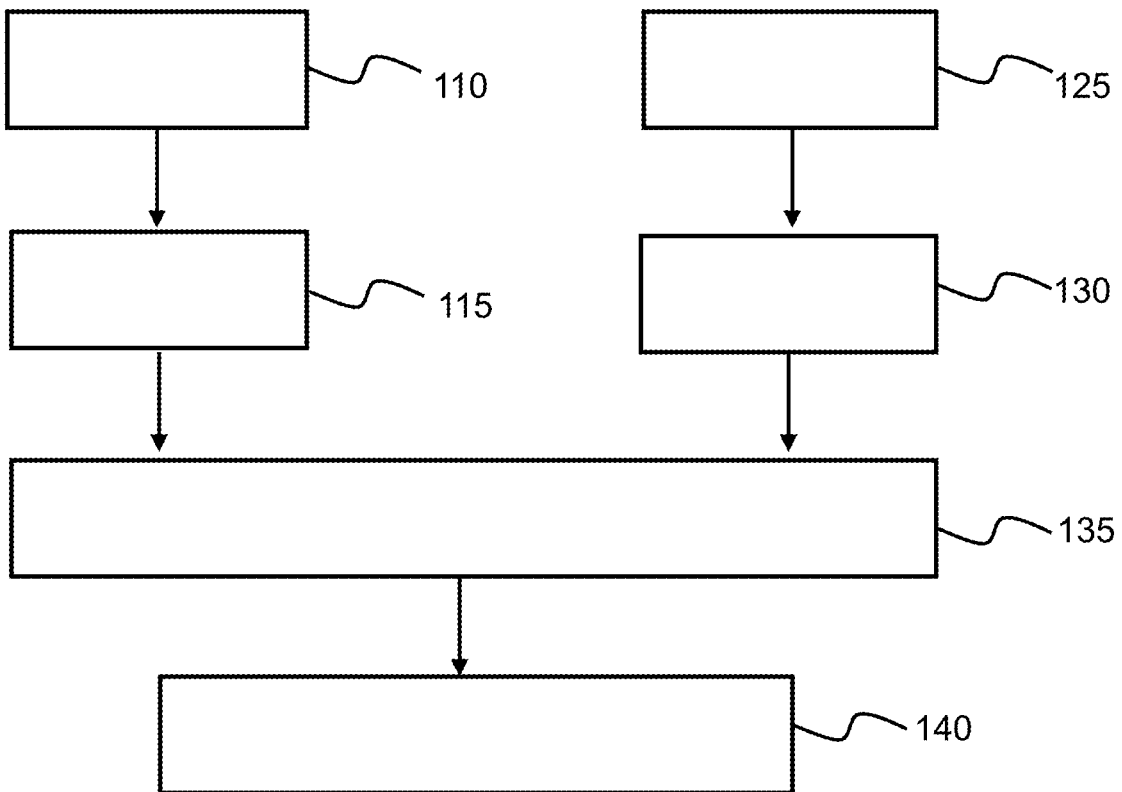
FIG. 1 shows a schematic illustration for a known method for calibrating data.

FIG. 1 shows a schematic illustration for a known method for calibrating an assistance system of a civilian motor vehicle. In a step 110, image data are determined by means of a camera device attached to the civilian motor vehicle. These image data are subjected to a brightness/intensity analysis in step 115 in order to determine certain image features. These image features are, for example, edges or corners of imaged objects.

Step 125 relates to the acquisition of three-dimensional distance data, for example by means of a lidar camera device. The distance data are present, for example, in the form of a point cloud and are likewise subjected to a brightness/intensity analysis in step 130. This usually initially comprises a reduction of the distance data to two-dimensional image data; in these two-dimensional image data, features are then detected, analogously to step 115.

In step 135, those features which are contained in both data sets and which can thus be assigned to each other are determined in the respectively detected features. From these assignments, a function is determined in step 140, with which the image data can be mapped onto the two-dimensionally reduced distance data. Subsequently, this function can be used to transform subsequent image data. The result of such a transformation can be combined with the distance data in order to display and/or highlight the distances of objects which are contained in the image data.

Figure 2:
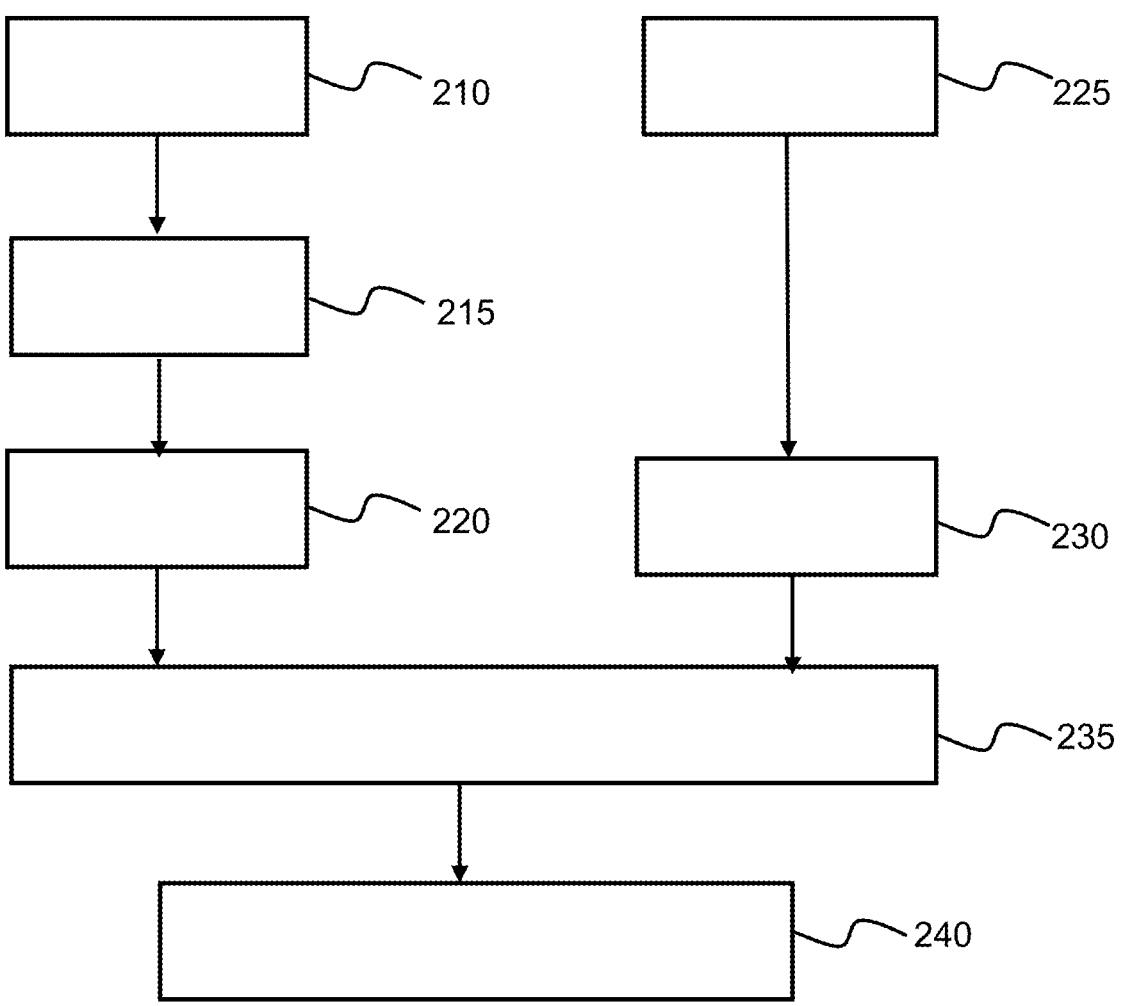
FIG. 2 shows a schematic illustration for a method according to the invention for calibrating data.

FIG. 2 shows a schematic illustration for a method according to the invention for calibrating an assistance system of a civilian motor vehicle. In step 210, the method captures two-dimensional image data by means of a camera device attached to the civilian motor vehicle. From these image data, distances between the civilian motor vehicle and objects represented in the image data are derived in step 215 and three-dimensional data are generated in this way. The derivation is preferably carried out by means of image analysis based on artificial intelligence, in particular using a neural network which derives information about distances of the respective objects or pixels thereof from specific image features. The derivation is carried out by a data processing device which is, for example, a component of the on-board electronics of the civilian motor vehicle or is accommodated on a remote server and receives the image data for processing via radio. As a result of step 210, three-dimensional image data are present, the third dimension of which is given by the determined distances.

In step 220, in one embodiment, characteristic object sections are determined from the derived distances and optionally also from the underlying image data. Step 220 is not absolutely necessary for the method 200 in one embodiment. The characteristic object sections are parts of detected objects or else complete objects. The characteristic object sections comprise, in particular, corners, edges and/or boundary lines of objects. In particular, the characteristic object sections each comprise a plurality of coordinates which belong to the same object. This determination can be carried out, for example, by three-dimensional edge detectors, connected component analysis or other methods, in particular also neural networks.

In step 225, depth data for the surroundings of the civilian motor vehicle are captured. For this purpose, a laser scanner with lidar function or a radar device is preferably used. Each device for measuring distance meters is suitable, in principle, for capturing the depth data. The depth data are present in three dimensions.

Analogously to step 220, in one embodiment, the depth data of are also examined for characteristic object sections in an analysis. As already explained, this comprises determining groups of coordinates which belong to the same object.

In step 235, the mutually corresponding distances of both data sets are determined from the coordinates of the distances in the three-dimensional image data and in the depth data. This can be carried out by way of a correlation of both data sets. Additionally or alternatively, a statistical analysis and/or optimization can be carried out. In one embodiment, the correspondences of these coordinates in both data sets are determined and maximized by means of transinformation, mutual information and/or synentropy. In one embodiment, instead of the distance coordinates, those object sections which coincide in both data sets can be determined as characteristic object sections of the distances derived from the image data and the depth data. For example, it is possible to determine by correlation methods which of the cohesive coordinates in one data set coincide with or correspond to cohesive coordinates of the other data set. If the correspondence lies above a predetermined threshold value, the coordinates of both data sets are marked as corresponding to one another or are otherwise stored together.

Step 240 relates to the determination of a transformation rule which maps the image data and depth data onto one another. In one example, the transformation rule comprises one or more transformation matrices which convert the image coordinates and/or depth coordinates into a different coordinate system. In addition or alternatively to transformation matrices, non-linear transformations can also be carried out. In one example, the image data are transformed from the three-dimensional image sensor coordinate system into the depth sensor coordinate system. This transformation is carried out with the proviso that the three-dimensional coordinates of the distances in the three-dimensional image sensor coordinate system coincide, after the transformation, with distance coordinates in the three-dimensional depth sensor coordinate system. The three-dimensional transformation rule obtained in this way can be reduced to a two-dimensional transformation rule which can subsequently be applied to two-dimensional image data. For example, the three-dimensional transformation rule can be represented by one or more matrices which are converted into a two-dimensional transformation rule by omitting matrix coefficients. Analogous operations are also possible with non-linear transformation rules. This two-dimensional transformation rule can now be applied to the two-dimensional image data in order to transform the latter into the depth sensor coordinate system. In one embodiment, the image data can be transformed into a two-dimensional projection of the depth sensor coordinate system.

In a further example, step 240 comprises transforming the depth data into the three-dimensional image sensor coordinate system so that the coordinates of the distances of both coordinate systems coincide. In this example, too, the transformation rule is initially three-dimensional. In this form, it can be applied to subsequent depth data in order to bring the latter into conformity with subsequent (two-dimensional) image data. This can comprise initially transforming the subsequent depth data three-dimensionally and subsequently projecting it onto the two dimensions of the image data, or else applying a two-dimensional projection of the transformation rule to two-dimensionally projected depth data.

In a further example, step 240 comprises transforming the three-dimensional image data and the depth data into a predetermined coordinate system so that the coordinates of the distances of the image sensor and depth sensor coordinate systems coincide in the predetermined coordinate system. In one embodiment, the predetermined coordinate system is likewise three-dimensional, and the determined transformation rule also maps from three dimensions onto three dimensions. Alternatively, the predetermined coordinate system can be two-dimensional, wherein the transformation rule maps from three onto two dimensions.

Following step 240, the determined transformation rule can be applied to subsequently recorded image data and/or depth data.

Figure 3A:
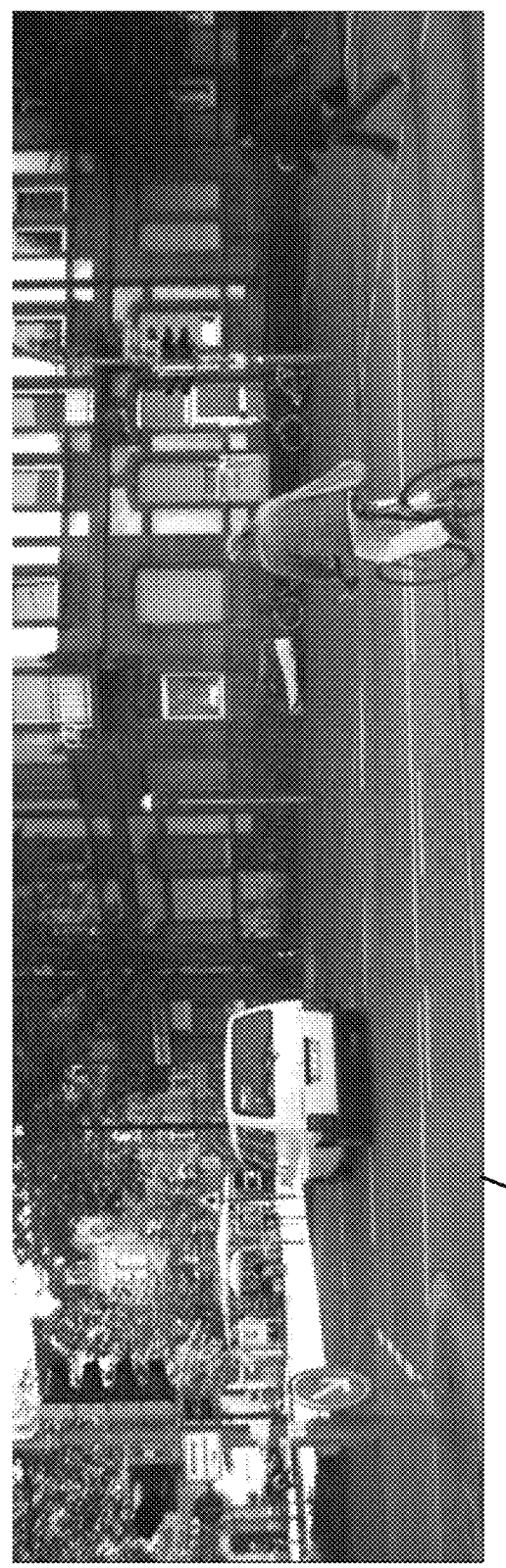
FIG. 3A shows an example of image data.
Figure 3B:
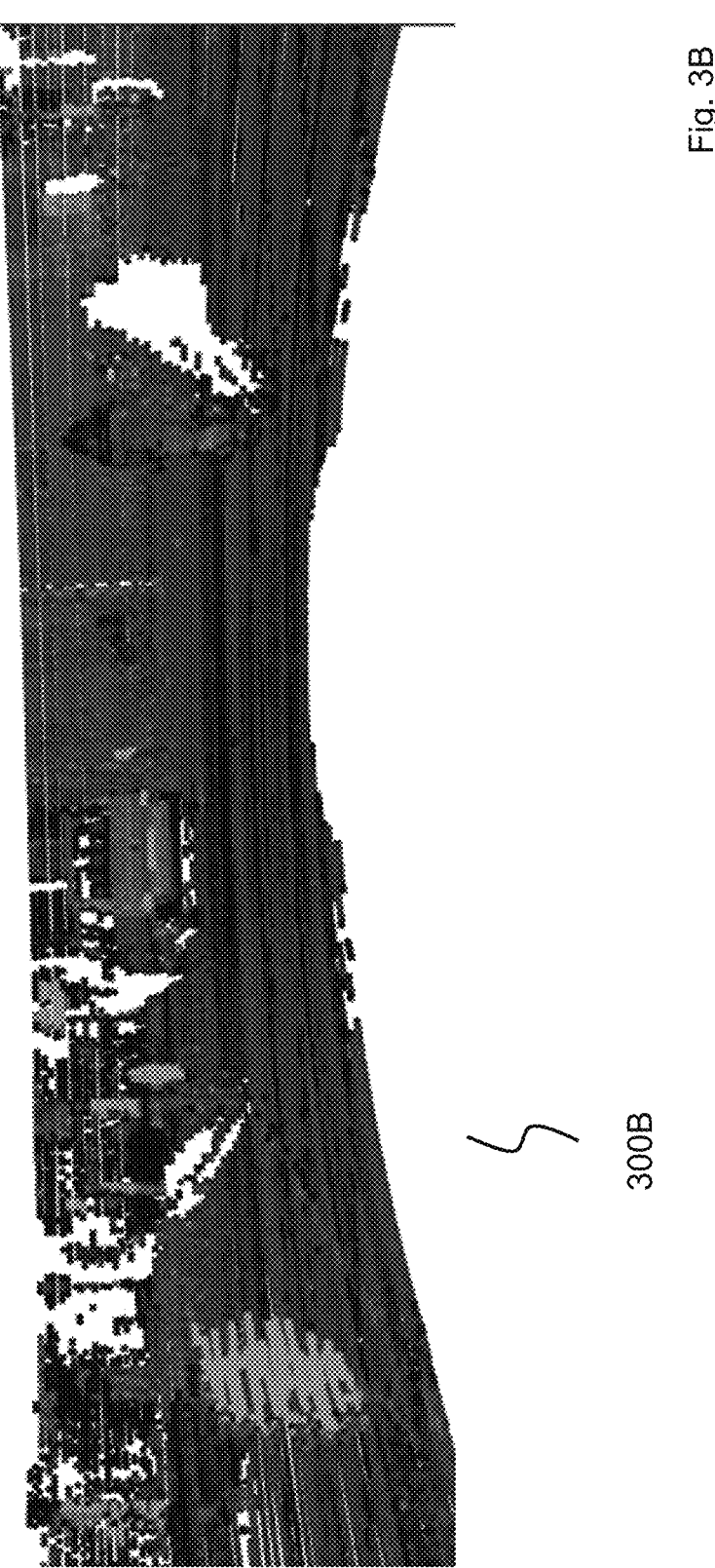
FIG. 3B shows an example of depth data.
Figure 3C:
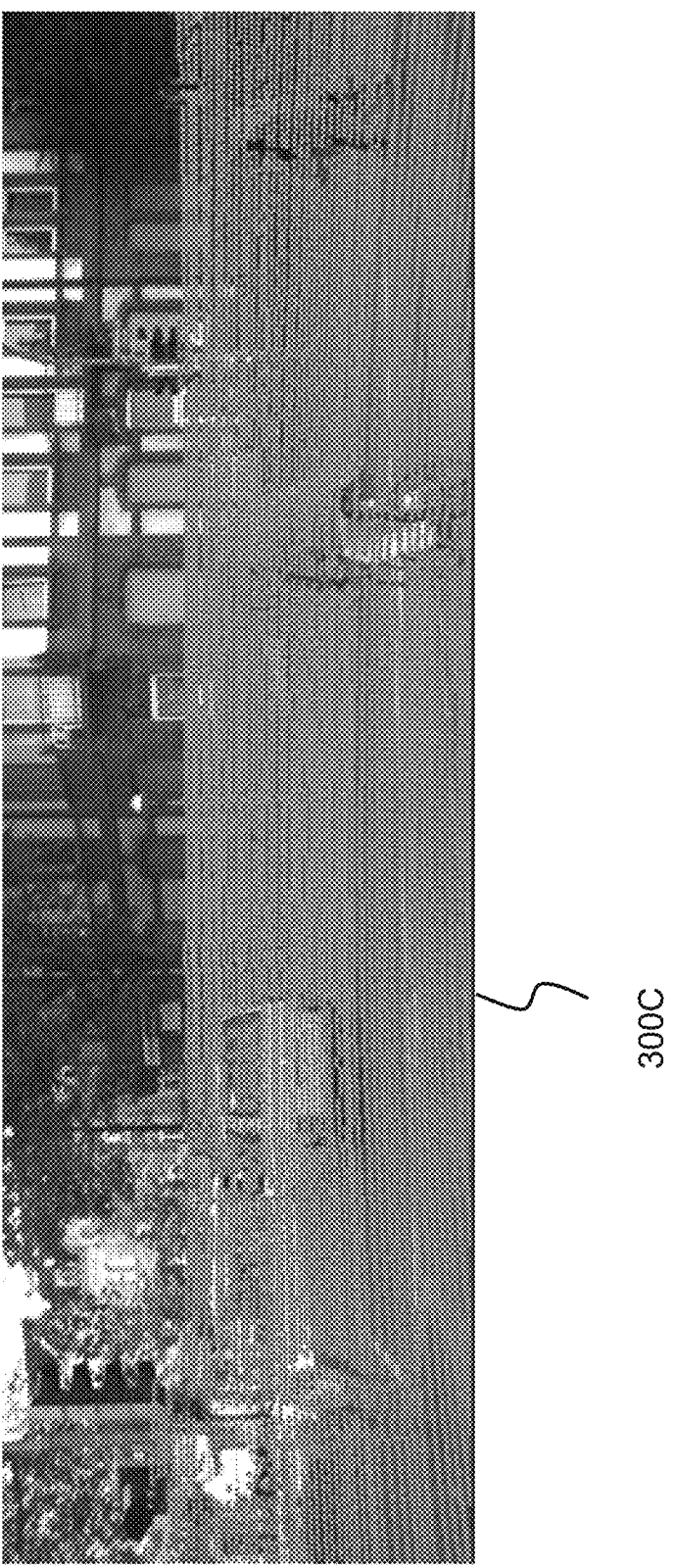
FIG. 3C shows an example of fused image data and depth data.

FIGS. 3A, 3B and 3C show exemplary image data and depth data. FIG. 3A shows image data 300A, represented here as a grayscale image. Each pixel comprises a brightness value. The image data can also be represented in color, for example as an RGB image. FIG. 3B shows depth data 300B. Each pixel comprises a brightness value which defines a distance of a respective location in the surroundings of a civilian motor vehicle from the recording device. For example, a brighter value can represent greater proximity, or vice versa. The depth data 300B are shown here as a grayscale image, but can also comprise color data, for example in RGB coding. Distances can likewise be represented by color values. Alternatively, the color values can code further information, for example a change in relation to previously recorded depth data.

Objects, for example a house facade, a motor vehicle, a cyclist and a pedestrian, are discernible in the image data 300A and depth data 300B. Further, the image data and depth data show different sections of the surroundings of the recording devices used, since the camera device and the depth sensor are oriented differently and/or attached at different locations.

The image data and depth data shown can be subjected to the analysis described above, wherein distances between the camera device and the represented objects are derived from the image data and added to the image data as third dimension. In one embodiment, characteristic object sections can be determined both in the three-dimensional image data and in the depth data. Subsequently, those characteristic object sections which coincide in both coordinate systems can be determined. From these matching characteristic object sections, a transformation rule can be determined which is subsequently applied to the image data and/or the depth data so that the latter are converted into a respective modified coordinate system. Irrespective of whether all distance data or only characteristic object sections are observed, the resulting data can be superimposed/fused in one example. Such a superimposition is shown in FIG. 3C as image 300C. The image 300C shows both the brightness values of the image data 300A and the brightness values of the depth data 300B; the latter can be recognized as continuous lines which indicate distances from the depth sensor by their colors and/or brightness values. As can be seen from image 300C, the differences in orientation and installation location of the recording devices were remedied by means of the transformation rule so that the image data and depth data could be superimposed correctly.

Figure 4:
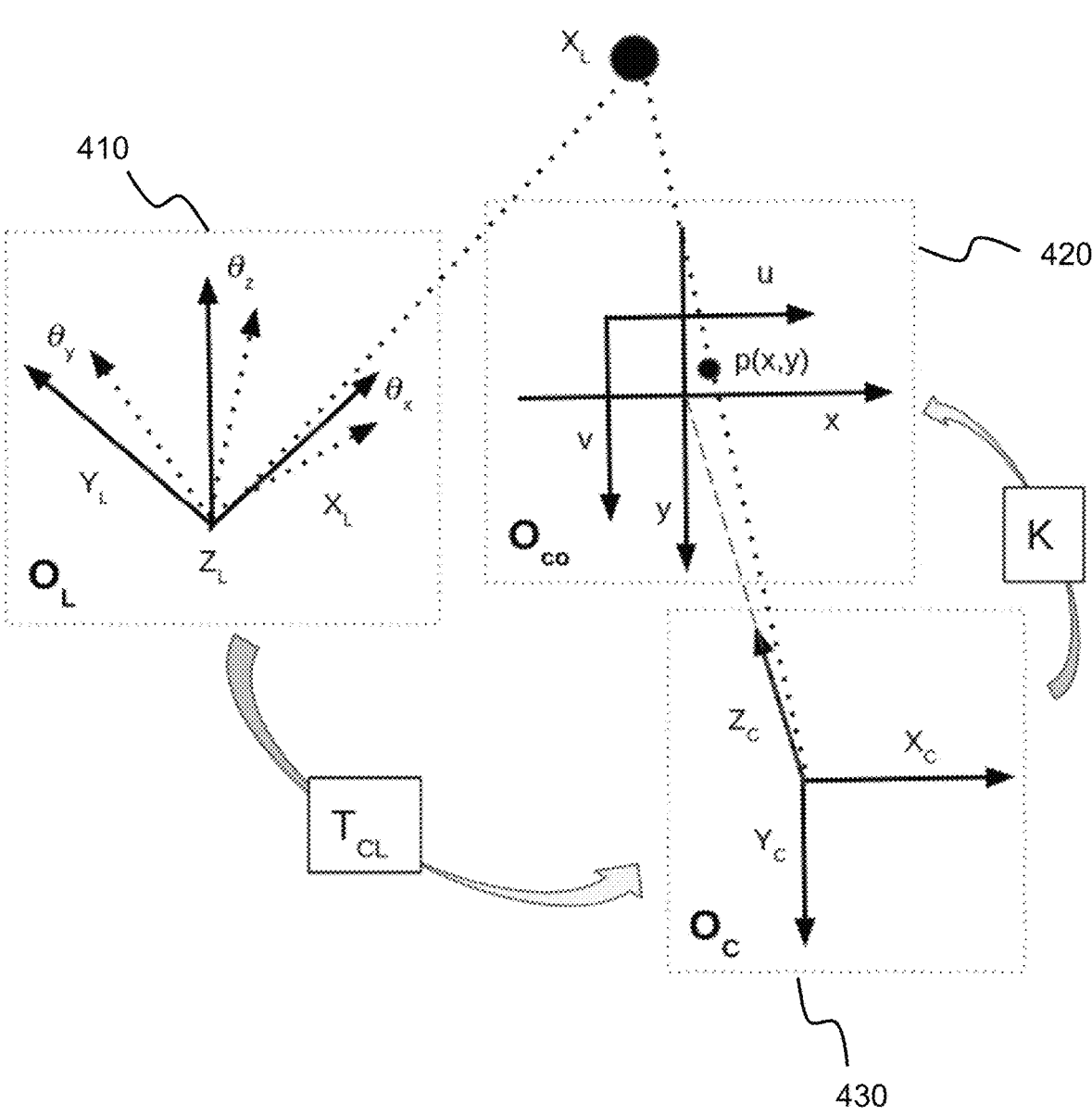
FIG. 4 shows a schematic illustration of the determination of a transformation rule.

FIG. 4 shows by way of example some coordinate systems which are used in the examples described here. FIG. 4 shows a point $X_L$ in the surroundings of a camera device and of a depth sensor or of a civilian motor vehicle to which they are attached. FIG. 4 further shows a three-dimensional depth sensor coordinate system 410 and a two-dimensional image sensor coordinate system 420. Distances are derived from image data which can be contained in the coordinate system 420 and three-dimensional data are thus generated. These are indicated by the three-dimensional coordinate system 430. In one embodiment, respective characteristic object sections can be determined from image data and distances on the one hand and depth data on the other hand. Further, those characteristic object sections which coincide in the coordinate systems 410 and 430 can be determined. In order to map the distance coordinates or the characteristic object sections of both coordinate systems onto one another, a transformation rule $T_{CL}$ can be determined. This can subsequently be reduced, for example, to two dimensions and in turn applied to the image sensor coordinate system 420. The resulting modified image sensor coordinate system is indicated by a displacement of the x- and y-axes of the coordinate system to u- and v-axes.

The features disclosed in the above description, the claims and the drawing can be significant both individually and in any desired combination for implementing the various embodiments.

What is claimed is:

1. A method for calibrating an assistance system of a civilian motor vehicle, comprising capturing image data for surroundings of a civilian motor vehicle by means of a camera device arranged on the civilian motor vehicle in an image sensor coordinate system;

capturing depth data for the surroundings of a civilian motor vehicle by means of a depth sensor device arranged on the civilian motor vehicle, wherein the depth data indicates first distances between the civilian motor vehicle and objects in the surroundings of the civilian motor vehicle in a depth sensor coordinate system;

determining first object sections based on the depth data;

deriving second distances between the civilian motor vehicle and objects in the surroundings of the civilian motor vehicle represented in the image data from the image data by means of an image analysis based on artificial intelligence in a data processing device, and creating three-dimensional image data from the image data and the second distances in a three-dimensional image sensor coordinate system;

determining second object sections based on the image data and the second distances;

determining mutually corresponding ones of the first and second object sections;

calibrating the image data and the depth data with respect to each other in the data processing device, comprising determining a transformation rule by means of which the three-dimensional image data are transformed into the depth sensor coordinate system so that the coordinates of the first and the second determined object sections coincide in the depth sensor coordinate system;

the depth data are transformed into the three-dimensional image sensor coordinate system so that the coordinates of the first and the second determined object sections coincide in the three-dimensional image sensor coordinate system; or the three-dimensional image data and the depth data are transformed into a predetermined coordinate system so that the coordinates of the first and the second determined object sections coincide in the predetermined coordinate system; and applying the transformation rule to subsequently acquired image data and/or depth data by means of the data processing device.

2. The method according to claim 1, wherein the transformation rule specifies a matrix for a coordinate transformation.

3. The method according to claim 1, wherein the calibrating the image data and the depth data with respect to each other is carried out continuously in real time.

4. The method according to claim 1, comprising fusing the image data transformed by means of applying the transformation rule and/or the depth data transformed by means of applying the transformation rule with each other or with the remaining image data or depth data to which the transformation rule does not apply, wherein image pixels and distances with coinciding coordinates are assigned to each other.

5. The method according to claim 4, wherein the fused data are used in a driver assistance system of the civilian motor vehicle.

6. The method according to claim 1, wherein applying the transformation rule to subsequently acquired image data comprises applying a two-dimensional projection of the transformation rule, and wherein applying the transformation rule to depth data comprises subjecting the depth data to a two-dimensional projection before or after applying the transformation rule.

7. The method according to any claim 1, wherein the method is carried out during a driving movement of the civilian motor vehicle.

8. The method according to claim 1, wherein the method is carried out without the use of a calibration standard.

9. The method according to claim 1, wherein the depth data is captured by means of at least one depth sensor device arranged on the civilian motor vehicle from the following group: lidar measuring device, time-of-flight measuring device and radar measuring device.

10. The method according to claim 1, wherein the image data is captured by means of at least one camera device arranged on the civilian motor vehicle from the following group: video image camera device, thermal image camera device and infrared camera device.

11. The method according to claim 1, wherein, when deriving distances between the civilian motor vehicle and objects in the surroundings of the civilian motor vehicle represented in the image data from the image data, the image analysis is based on artificial intelligence in the form of a neural network, in particular a monodepth network.

12. The method according to claim 1, comprising capturing further image data for the surroundings of the civilian motor vehicle by means of a further camera device arranged on the civilian motor vehicle in a further image sensor coordinate system.

13. The method according to claim 1, comprising capturing further depth data for the surroundings of a civilian motor vehicle by means of a further depth sensor device arranged on the civilian motor vehicle, wherein the further depth data indicates distances between the civilian motor vehicle and objects in the surroundings of the civilian motor vehicle in a further depth sensor coordinate system.

14. A civilian motor vehicle, comprising
a camera device;
a depth sensor device; and
a data processing device;
wherein the civilian motor vehicle is configured to carry out the method according to claim 1.

* * * * *